(12) United States Patent
Ishizuka

(10) Patent No.: US 10,645,006 B2
(45) Date of Patent: May 5, 2020

(54) INFORMATION SYSTEM, CONTROL APPARATUS, COMMUNICATION METHOD, AND PROGRAM

(75) Inventor: Eiichi Ishizuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 554 days.

(21) Appl. No.: 13/993,674

(22) PCT Filed: Dec. 27, 2011

(86) PCT No.: PCT/JP2011/080178
§ 371 (c)(1),
(2), (4) Date: Jun. 12, 2013

(87) PCT Pub. No.: WO2012/090993
PCT Pub. Date: Jul. 5, 2012

(65) Prior Publication Data
US 2013/0286844 A1    Oct. 31, 2013

(30) Foreign Application Priority Data

Dec. 28, 2010 (JP) .................. 2010-292015

(51) Int. Cl.
*H04L 12/801* (2013.01)
*H04L 12/721* (2013.01)
(Continued)

(52) U.S. Cl.
CPC .......... *H04L 47/15* (2013.01); *H04L 12/1886* (2013.01); *H04L 45/38* (2013.01); *H04L 45/64* (2013.01)

(58) Field of Classification Search
CPC ......... H04L 47/15; H04L 45/38; H04L 45/64; H04L 45/42; H04L 12/56; H04L 12/70; H04L 45/52; H04L 12/1886
See application file for complete search history.

(56) References Cited

U.S. PATENT DOCUMENTS 7,937,438 B1 * 5/2011 Miller et al. .................. 709/203
8,223,649 B2 * 7/2012 Rangarajan ......... H04L 12/5692
370/238

(Continued)

FOREIGN PATENT DOCUMENTS

CN    101001099 A    7/2007
CN    101123526 A    2/2008
(Continued)

OTHER PUBLICATIONS

Japanese Office Action dated Jul. 22, 2014 with a partial English translation.
(Continued)

*Primary Examiner* — Benjamin H Elliott, IV
(74) *Attorney, Agent, or Firm* — McGinn IP Law Group, PLLC

(57) ABSTRACT

An information system includes: a plurality of physical nodes each processing a packet supplied from an external node in accordance with a packet handling operation in which a matching rule that determines a flow and a processing content that is applied to a packet matching the matching rule are associated with each other; and a control apparatus setting the packet handling operation in the plurality of physical nodes and causing the plurality of physical nodes to operate as virtual nodes on a virtual network that can be used by the external node. The control apparatus includes a broadcast range management unit managing a broadcast range configured by physical nodes corresponding to a previously-selected virtual node group on the virtual network and interface information about the physical nodes. The control apparatus refers to a network topology established by a connection relationship among the physical nodes and sets a packet handling operation realizing broad- (Continued)

cast communication within the broadcast range in physical nodes on a path of the broadcast communication.

20 Claims, 7 Drawing Sheets

(51) Int. Cl.
*H04L 12/18* (2006.01)
*H04L 12/715* (2013.01)

(56) References Cited

U.S. PATENT DOCUMENTS

| | | | |
|---|---|---|---|
| 8,584,228 B1* | 11/2013 | Brandwine | H04L 63/06 380/255 |
| 9,282,027 B1* | 3/2016 | Brandwine | H04L 12/4641 |
| 9,369,293 B2* | 6/2016 | Li | G06F 3/0484 |
| 2005/0232263 A1* | 10/2005 | Sagara | 370/389 |
| 2009/0138577 A1* | 5/2009 | Casado | H04L 41/06 709/220 |
| 2009/0225663 A1* | 9/2009 | Kaiduka | H04L 41/06 370/242 |
| 2010/0272110 A1* | 10/2010 | Allan | H04L 45/02 370/395.53 |
| 2010/0278069 A1* | 11/2010 | Sharma | H04L 45/02 370/254 |
| 2010/0329252 A1* | 12/2010 | Mulamalla et al. | 370/390 |
| 2011/0310899 A1* | 12/2011 | Alkhatib | H04L 29/12047 370/392 |
| 2012/0076150 A1* | 3/2012 | Perlman | H04L 12/4641 370/395.53 |

FOREIGN PATENT DOCUMENTS

| | | |
|---|---|---|
| JP | 2009-141425 | 6/2009 |
| JP | 2009-212739 A | 9/2009 |
| JP | 2010-200026 A | 9/2010 |
| WO | WO 2007/079697 A1 | 7/2007 |
| WO | WO 2008/095010 A1 | 8/2008 |
| WO | WO 2009/118050 A1 | 10/2009 |
| WO | WO 2010/110235 A1 | 9/2010 |

OTHER PUBLICATIONS

Korean Office Action dated Aug. 29, 2014, with an English Translation.
International Search Report in PCT/JP2011/080178 dated Jan. 31, 2012.
Nick McKeown et al, "OpenFlow: Enabling Innovation in Campus Networks", [last retrieved on Dec. 1, 2010] Mar. 14, 2008, Internet <URL: http://www.openflowswitch.org/documents/ openflow-wp-latest.pdf>.
"OpenFlow Switch Specification" Version 1.1.0. (Wire Protocol 0x01) [last retrieved on Dec. 1, 2010] Dec. 31, 2009 Internet <URL: http://www.openflowswitch.org/documents/openflow-spec-v1.0.0. pdf>.
Hajimu Hirai et al., "An Overlay Multicast System with Priority Control", IEICE Technical Report (Technical Report of IEICE, vol. 108, No. 458, Feb. 24, 2009, pp. 185-190 (IN2008-163).
Chinese Office Action dated Feb. 3, 2015, with a Japanese Translation along with a partial English translation.
Extended European Search Report dated Sep. 29, 2017.

* cited by examiner

FIG. 6

| SETTING TARGET PHYSICAL NODES | BROADCAST FLOW ENTRIES | |
|---|---|---|
| PHYSICAL NODE A | MATCHING RULE | PROCESSING CONTENT (ACTION) |
| PHYSICAL NODE B | MATCHING RULE | PROCESSING CONTENT (ACTION) |
| .. | .. | .. |
| PHYSICAL NODE J | MATCHING RULE | PROCESSING CONTENT (ACTION) |

FIG. 7

| Wildcards | In Port | Ether SA | Ether DA | Ether type | VLAN ID | VLAN PCP | IP SA | IP DA | IP proto | IP ToS bits | TCP/UDP src port | TCP/UDP dst port | Counters | Actions |

Header Fields; MATCHING RULES

INFORMATION SYSTEM, CONTROL APPARATUS, COMMUNICATION METHOD, AND PROGRAM

FIELD

Reference to Related Application

The present invention is based upon and claims the benefit of the priority of Japanese patent application No. 2010-292015, filed on Dec. 28, 2010, the disclosure of which is incorporated herein in its entirety by reference thereto.

The present invention relates to an information system, a control apparatus, a communication method, and a program. In particular, it relates to an information system, a control apparatus, a communication method, and a program configured by using a forwarding node processing an incoming packet in accordance with a processing rule (packet handling operation) matching the incoming packet.

BACKGROUND

In recent years, a technique referred to as OpenFlow has been proposed (see Patent Literature 1 and Non Patent Literatures 1 and 2). OpenFlow recognizes communications as end-to-end flows and performs path control, failure recovery, load balancing, and optimization on a per-flow basis. An OpenFlow switch according to Non Patent Literature 2 has a secure channel for communication with an OpenFlow controller that serves as a control apparatus. In addition, the OpenFlow switch operates according to a flow table suitably added or rewritten by the OpenFlow controller. In a flow table, a set of the following three is defined for each flow: matching rules (Header Fields) against which a packet header is matched; flow statistical information (Counters); and Actions that define processing contents (see FIG. 7).

For example, if the OpenFlow switch receives a packet, the OpenFlow switch searches the flow table for an entry having a matching rule (see Header Fields in FIG. 7) that matches header information of the incoming packet. If the OpenFlow switch finds an entry matching the incoming packet as a result of the search, the OpenFlow switch updates the flow statistical information (Counters) and processes the incoming packet based on a processing content (packet transmission from a specified port, flooding, drop, etc.) written in the Actions field of the entry. If the OpenFlow switch does not find an entry matching the incoming packet as a result of the search, the OpenFlow switch forwards the incoming packet to the OpenFlow controller via the secure channel, to request the OpenFlow controller to determine a packet path based on the source and destination nodes of the incoming packet. After receiving a flow entry realizing the packet path, the OpenFlow switch updates the flow table. In this way, by using an entry stored in the flow table as a processing rule, the OpenFlow switch executes packet forwarding.

Patent Literature 2 discloses a data processing system which transfers broadcast data only to nodes belonging to a certain closed group among the nodes in a single network. Specifically, in the data processing system disclosed in Patent Literature 2, broadcast data outputted from one node is acquired, and a source address is acquired from the acquired broadcast data. Addresses for forwarding the broadcast data only to the nodes other than the node corresponding to the source address, these nodes belonging to the group corresponding to the acquired source address, are acquired from group management information. The group management information defines a correspondence relationship between the group and the address of each node belonging to the group. The destination addresses of the acquired broadcast data are determined as the destination addresses acquired from the group management information and the broadcast data is forwarded to the other nodes via a network.

CITATION LIST

Patent Literature

[Patent Literature 1]
International Publication No. 2008/095010
[Patent Literature 2]
Japanese Patent Kokai Publication No. JP2009-212739A Non Patent Literature

[Non Patent Literature 1]
Nick McKeown, and seven others, "OpenFlow: Enabling Innovation in Campus Networks," [online], [searched on Dec. 1, 2010], Internet <URL: http://www.openflowswitch.org//documents/openflow-wp-latest.pdf>
[Non Patent Literature 2]
"OpenFlow Switch Specification" Version 1.0.0. (Wire Protocol 0x01) [Searched on Dec. 1, 2010], Internet <URL: http://www.openflowswitch.org/documents/openflow-spec-v1.0.0.pdf>

SUMMARY

The disclosures of the above patent literatures and non patent literatures are incorporated herein by reference thereto. The following analysis has been given by the present invention.

In the virtual network configured by using the above OpenFlow technique, broadcast communication (broadcast or multicast) can be executed by setting processing rules defining processing contents that broadcast communication packets are transmitted from a plurality of ports in physical nodes. However, when the processing rules are not set, if broadcast communication packets flow into the network, these packets are received by a plurality of physical nodes. As a result, since many processing rule setting requests are transmitted simultaneously, load on a control apparatus responding to these processing rule setting requests is rapidly increased, counted as a problem.

Patent Literature 2 discloses a method for forwarding broadcast data only to nodes belonging to a certain closed group. However, Patent Literature 2 does not disclose a method for responding to generation of the above simultaneous multiple processing rule setting requests.

The present invention has been made in view of the above circumstances, and it is an object of the present invention to provide a configuration and a method for enabling an information system in which a control apparatus as in the above OpenFlow controls a plurality of physical nodes to achieve efficient broadcast communication.

According to a first aspect, there is provided an information system comprising: a plurality of physical nodes each processing a packet supplied from an external node in accordance with a processing rule (packet handling operation) in which a matching rule that determines a flow and a processing content that is applied to a packet matching the matching rule are associated with each other; and a control apparatus setting the processing rule in the plurality of physical nodes and causing the plurality of physical nodes to operate as virtual nodes on a virtual network that can be used by the external node; wherein the control apparatus includes a broadcast range management unit managing a broadcast range configured by physical nodes corresponding to a previously-selected virtual node group on the virtual network and interface information about the physical nodes; and wherein the control apparatus refers to a network topology established by a connection relationship among the physical nodes and sets a processing rule realizing broadcast communication within the broadcast range in physical nodes on a path(s) of the broadcast communication.

According to a second aspect, there is provided a control apparatus, which is connected to a plurality of physical nodes each processing a packet supplied from an external node in accordance with a processing rule (packet handling operation) in which a matching rule that determines a flow and a processing content that is applied to a packet matching the matching rule are associated with each other. The control apparatus comprises: a broadcast range management unit managing a broadcast range configured by physical nodes corresponding to a previously-selected virtual node group on a virtual network realized by setting the processing rule in the physical nodes and interface information about the physical nodes; wherein the control apparatus refers to a network topology established by a connection relationship among the physical nodes and sets a processing rule realizing broadcast communication within the broadcast range in physical nodes on a path(s) of the broadcast communication.

According to a third aspect, there is provided a communication method, comprising: causing a control apparatus, which is connected to a plurality of physical nodes each processing a packet supplied from an external node in accordance with a processing rule (packet handling operation) in which a matching rule that determines a flow and a processing content that is applied to a packet matching the matching rule are associated with each other, to execute steps of: updating a broadcast range configured by physical nodes corresponding to a previously-selected virtual node group on a virtual network realized by setting the processing rule in the physical nodes and interface information about the physical nodes; referring to the broadcast range and a network topology established by a connection relationship among the physical nodes and creating a processing rule realizing broadcast communication within the broadcast range; and setting the created processing rule in physical nodes on a path(s) of the broadcast communication. This method is associated with a certain machine, that is, with the control apparatus setting the processing rule in the physical nodes.

According to a fourth aspect, there is provided a program, causing a computer constituting a control apparatus, which is connected to a plurality of physical nodes each processing a packet supplied from an external node in accordance with a processing rule (packet handling operation) in which a matching rule that determines a flow and a processing content that is applied to a packet matching the matching rule are associated with each other, to execute processes of: updating a broadcast range configured by physical nodes corresponding to a previously-selected virtual node group on a virtual network realized by setting the processing rule in the physical nodes and interface information about the physical nodes; referring to the broadcast range and a network topology established by a connection relationship among the physical nodes and creating a processing rule realizing broadcast communication within the broadcast range; and setting the created processing rule in physical nodes on a path(s) of the broadcast communication. This program can be recorded in a computer-readable storage medium. Namely, the present invention can be embodied as a computer program product.

The meritorious effects of the present invention are summarized as follows. According to the present disclosure, an information system in which a control apparatus controls a plurality of physical nodes can achieve efficient broadcast communication.

BRIEF DESCRIPTION OF DRAWINGS

FIG. 6 illustrates broadcast processing rules created by a processing rule determination unit of the control apparatus according to the first exemplary embodiment of the present invention.

FIG. 7 illustrates a configuration of a flow entry disclosed in Non Patent Literature 2.

PREFERRED MODES

Figure 1:
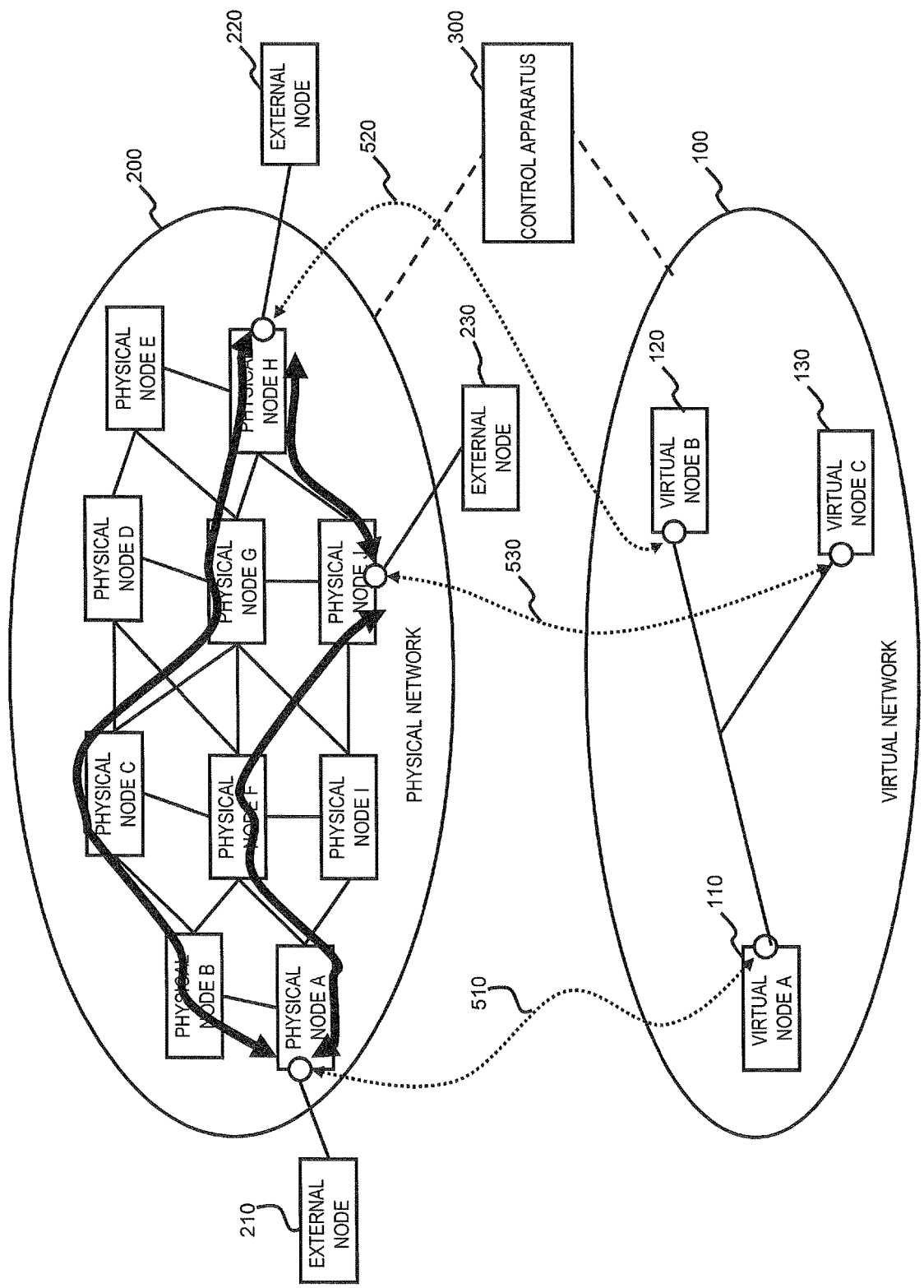
FIG. 1 illustrates an outline of the present invention.

First, an outline of an exemplary embodiment of the present invention will be described. An exemplary embodiment of the present invention can be realized by a plurality of physical nodes each processing a packet supplied from an external node in accordance with a processing rule in which a matching rule that determines a flow and a processing content that is applied to a packet matching the matching rule are associated with each other and a control apparatus setting the processing rule in the plurality of physical nodes and causing the plurality of physical nodes to operate as virtual nodes on a virtual network that can be used by the external node. Specifically, the control apparatus includes a broadcast range management unit managing a broadcast range configured by physical nodes corresponding to a previously-selected virtual node group on the virtual network and interface information about the physical nodes. The control apparatus refers to a network topology established by a connection relationship among the physical nodes and sets a processing rule realizing broadcast communication with respect to the previously-selected virtual node group on the virtual network managed by the broadcast range management unit in physical nodes on a path(s) of the broadcast communication. In the following outline, various components are denoted by reference characters for the sake of convenience. Namely, the following reference characters are merely used as examples to facilitate understanding of the present invention, not to limit the present invention to the illustrated modes.

For example, if a virtual network 100 is configured by virtual nodes 110 to 130 based on a group of physical nodes in a physical network 200 in FIG. 1, a control apparatus 300 refers to configuration information about the virtual nodes 110 to 130, namely, physical nodes (physical nodes A, H, and J in FIG. 1) corresponding to the virtual nodes 110 to 130 and interface information about the physical nodes. The control apparatus 300 determines a group of interfaces logically assigned to the virtual nodes 110 to 130 (interfaces of the physical nodes A, H, and J in FIG. 1 connected to external nodes) as a distribution range. Namely, the control apparatus 300 previously determines a virtual network broadcast range and sets broadcast communication processing rules in the physical nodes, irrespective of timing of generation of broadcast communication.

Since a processing rule realizing broadcast communication is set as described above, when a physical node receives a packet matching a matching rule of the processing rule, the physical node transmits the broadcast communication packet from a specified interface in accordance with the processing rule. Thus, since many processing rule setting requests are not transmitted simultaneously to the control apparatus, an increase of load on the control apparatus, which would otherwise be caused, is accordingly prevented.

First Exemplary Embodiment

Figure 2:
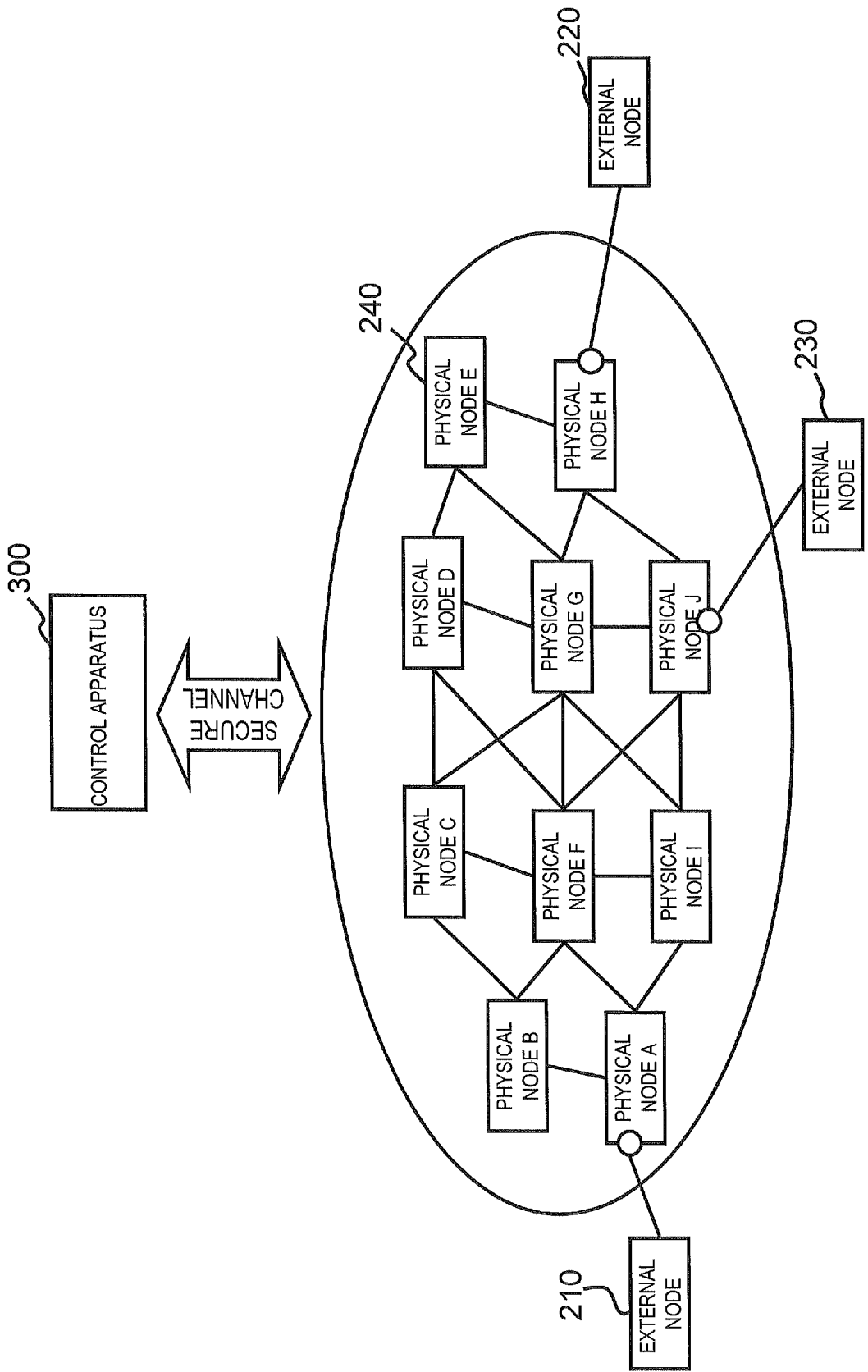
FIG. 2 illustrates an overall configuration according to a first exemplary embodiment of the present invention.

Next, a first exemplary embodiment of the present invention will be described in detail with reference to the drawings. FIG. 2 illustrates an overall configuration (physical configuration) according to the first exemplary embodiment of the present invention. In FIG. 2, a plurality of physical nodes A to J constituting a physical network (these physical nodes A to J will hereinafter be referred to as physical nodes 240, unless the physical nodes need to be particularly distinguished from each other) are connected to the control apparatus 300 setting processing rules in these physical nodes via secure channels.

Each physical node 240 has a function of searching, when receiving a packet from any one of the external nodes 210 to 230, the processing rules set by the control apparatus 300 for a processing rule having a matching rule matching the incoming packet and a function of processing the incoming packet in accordance with the retrieved processing rule. Such physical node 240 can be realized by using an OpenFlow switch in Non Patent Literature 2.

The control apparatus 300 is an apparatus setting a processing rule in which a matching rule that determines a flow and a processing content that is applied to a packet matching the matching rule are associated with each other. For example, the control apparatus 300 can configure a virtual network as illustrated in FIG. 1, by causing the physical nodes A, H, and J in FIG. 2 to operate as virtual nodes A, B, and C used by the external nodes 210 to 230 and by setting processing rules for forwarding packets among the physical nodes A, H, and J in accordance with a previously-calculated path(s) in the physical nodes among the physical nodes A, H, and J.

Figure 3:
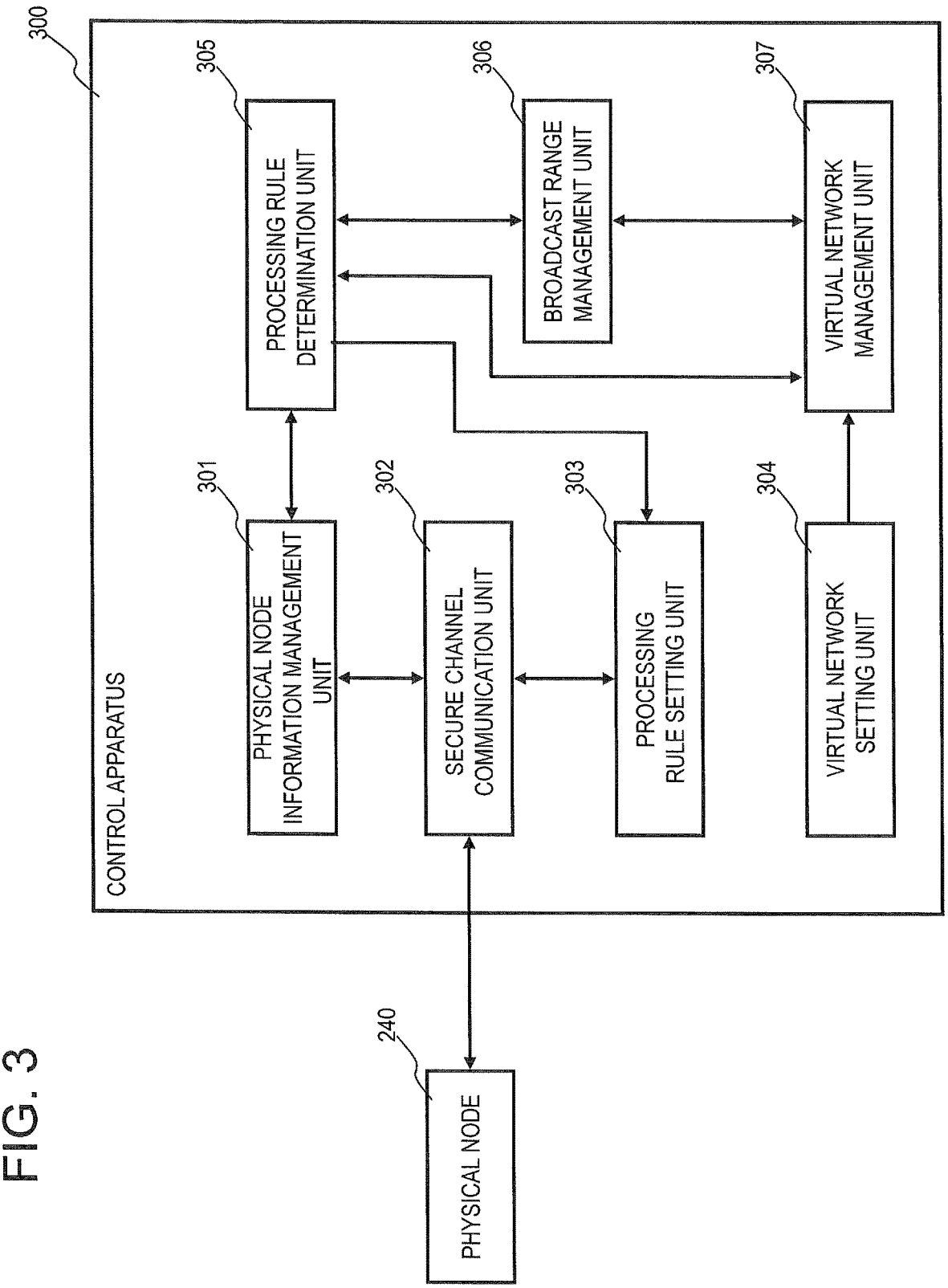
FIG. 3 is a block diagram illustrating a detailed configuration of a control apparatus according to the first exemplary embodiment of the present invention.

FIG. 3 is a block diagram illustrating a detailed configuration of the control apparatus having the above functions. In FIG. 3, the control apparatus 300 includes a physical node information management unit 301, a secure channel communication unit 302, a processing rule setting unit 303, a virtual network setting unit 304, a processing rule determination unit 305, a broadcast range management unit 306, and a virtual network management unit 307.

The physical node information management unit 301 communicates with the physical nodes 240 arranged on the physical network 200 managed by the control apparatus 300 via the secure channel communication unit 302 through the respective secure channels. For example, the physical node information management unit 301 collects capability information about the physical nodes 240 and port state information about each physical node. In addition, based on the collected information, the physical node information management unit 301 establishes and manages a network topology representing a connection relationship among the plurality of physical nodes 240.

In addition, if change of a configuration of a physical node 240 (for example, addition of a physical node 240, a setting change of a physical node 240, stoppage of a physical node 240 due to a failure, or the like) is caused, the physical node information management unit 301 collects and updates relevant information as needed and modifies the network topology.

The secure channel communication unit 302 manages a secure channel between the control apparatus 300 and each physical node 240 and executes communication processing on the secure channel. Hereinafter, the present exemplary embodiment will be described, assuming that each physical node 240 is configured by an OpenFlow switch in Non Patent Literature 2 and that the secure channel communication unit 302 uses the OpenFlow protocol in Non Patent Literature 2 to exchange necessary information with each physical node 240.

The processing rule setting unit 303 sets a processing rule determined by the processing rule determination unit 305 in a physical node 240 via the secure channel communication unit 302.

The virtual network setting unit 304 manages information about settings of a virtual network 100, as virtual network establishment information for virtually realizing and managing communication on the physical network 200 managed by the control apparatus 300. Specifically, the virtual network setting unit 304 supplies the virtual network management unit 307 with the number of virtual nodes on the virtual network 100, information about a topology of the virtual nodes, and mapping information (see bidirectional arrows 510 to 530 indicated by dotted lines in FIG. 1) about interfaces of the physical nodes 240 logically assigned to the virtual nodes.

Figure 4:
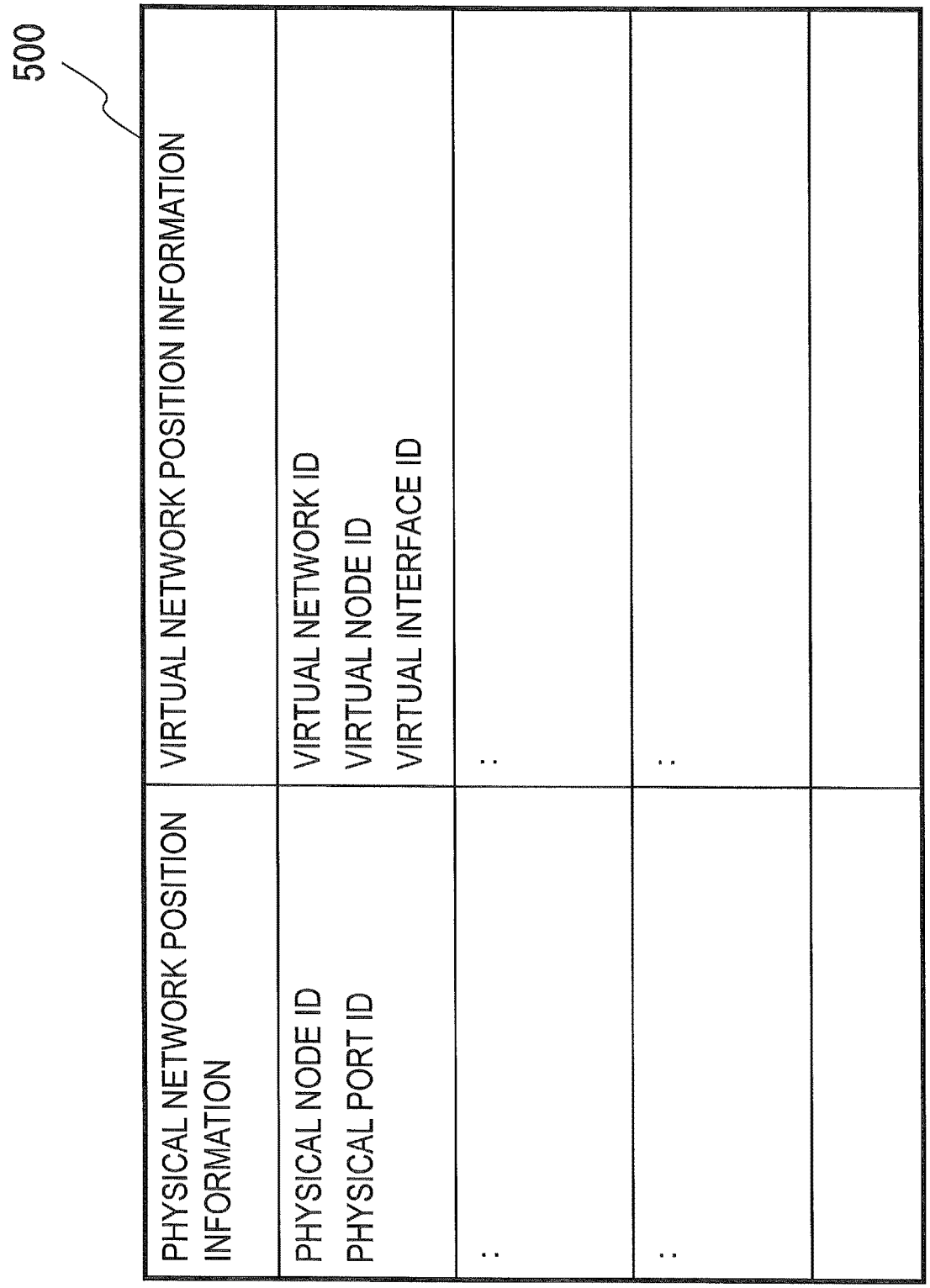
FIG. 4 illustrates mapping information managed by a virtual network setting unit of the control apparatus according to the first exemplary embodiment of the present invention.

FIG. 4 illustrates mapping information managed by the virtual network setting unit 304. The mapping information is configured by an entry 500 in which a physical node ID and a physical port ID corresponding thereto are associated with a virtual network ID, a virtual nodes ID, and a virtual interface ID.

Such virtual network setting information can be managed by preparing a database for the virtual network setting information in the control apparatus 300. In addition, a UI (User Interface) may be arranged so that the virtual network setting information can be inputted or changed from outside, for example. A user may be allowed to change a setting of the virtual network within a certain range.

The processing rule determination unit 305 refers to the network topology supplied from the physical node information management unit 301 and the virtual network configuration information (information about the physical nodes corresponding to the virtual nodes) supplied from the virtual network management unit 307, to calculate a path on the physical network 200 realizing communication among the virtual nodes on the virtual network 100 and a processing rule realizing the path.

In addition, based on the network topology supplied from the physical node information management unit 301 and a broadcast range supplied from the broadcast range management unit 306, the processing rule determination unit 305 according to the present exemplary embodiment calculates a path(s) on the physical network 200 realizing broadcast communication among the virtual nodes on the virtual network 100 and a processing rule realizing the path(s).

Arbitrary paths may be generated among the virtual nodes determined by the processing rule determination unit 305, as long as the paths allow the interfaces assigned by the mapping information 510 to 530 to deliver packets. The paths are not limited to those indicated by thick arrows in FIG. 1. For example, a path between the physical nodes A and J may be set so that packets are forwarded via the physical node I, instead of via the physical node F. In addition, while bidirectional paths in a mesh structure may be set as illustrated by the paths indicated by the thick arrows in FIG. 1, for example, a unidirectional path for forwarding a packet sequentially from the physical nodes A, H, to J or the physical nodes A, J, to H may be set.

The virtual network management unit 307 refers to the virtual network setting information supplied from the virtual network setting unit 304 and manages configurations of the virtual nodes in the virtual network, for example. In addition, the virtual network management unit 307 supplies the broadcast range management unit 306 with mapping information (see the bidirectional arrows 510 to 530 indicated by dotted lines in FIG. 1) about interfaces of the physical nodes 240 logically assigned to interfaces of the virtual nodes managed by the control apparatus 300, for example.

The broadcast range management unit 306 refers to the mapping information (see the bidirectional arrows 510 to 530 indicated by dotted lines in FIG. 1) about interfaces of the physical nodes 240 logically assigned to interfaces of the virtual nodes in each virtual network, the mapping information having been supplied from the virtual network management unit 307, and determines and manages a broadcast communication range having a collection of interfaces logically assigned in each virtual network as a destination. If the collection of interfaces logically assigned in a virtual network indicates all the interfaces logically assigned to the virtual nodes in the virtual network, the broadcast range management unit 306 manages a virtual network broadcast domain.

Each unit (processing means) of the control apparatus 300 illustrated in FIG. 3 can be realized by a computer program for causing a computer constituting the control apparatus 300 to use hardware of the computer and to execute each process described above.

Figure 5:
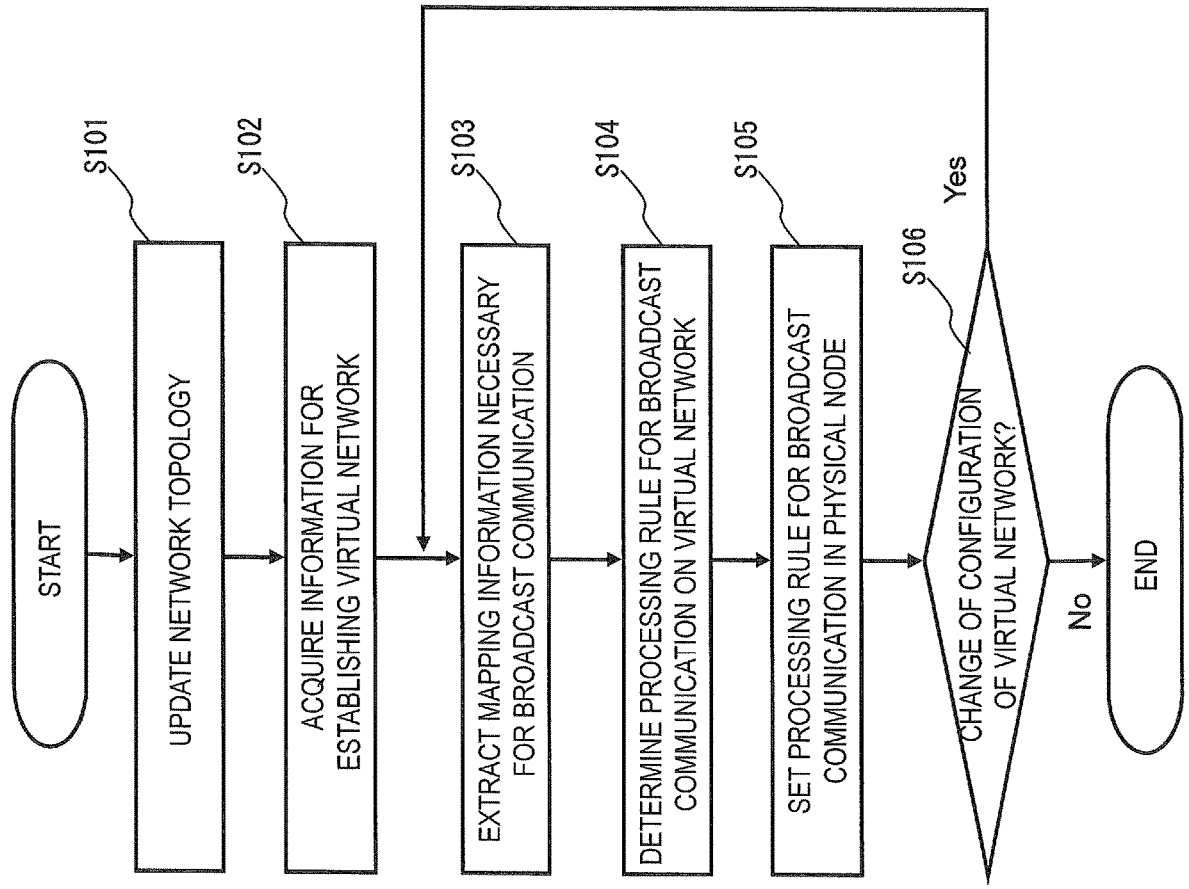
FIG. 5 is a flow chart illustrating an operation of the control apparatus according to the first exemplary embodiment of the present invention.

Next, an operation according to the present exemplary embodiment, in particular, a process of setting a processing rule for realizing broadcast communication will be described in detail with reference to the drawings. FIG. 5 is a flow chart illustrating an operation of the control apparatus 300 according to the first exemplary embodiment of the present invention. In FIG. 5, first, the control apparatus 300 communicates with the physical nodes 240 arranged in the physical network 200 managed by the control apparatus 300 on the respective secure channels and updates a physical network topology (step S101).

Next, the control apparatus 300 acquires information about settings of a virtual network to be processed from the virtual network setting unit 304 (step S102).

Next, the control apparatus 300 determines a broadcast communication range set on the virtual network based on the acquired virtual network setting information (step S103). For example, if the virtual nodes A to C on the virtual network 100 in FIG. 1 are used as a broadcast domain, based on the interfaces of the virtual nodes 110 to 130, a combination of interfaces of the physical nodes A, H, and J in FIG. 1 directly connected to the external nodes 210 to 230 is outputted to the processing rule determination unit 305 as a broadcast communication range.

Next, the processing rule determination unit 305 of the control apparatus 300 determines a processing rule for realizing broadcast communication within the network topology updated in step S101 and the broadcast communication range extracted in step S103 (step S104). Specifically, the processing rule determination unit 305 calculates a path between physical nodes A and H, a path between A and J, and a path between H and J in FIG. 1 and determines processing rules for forwarding broadcast communication packets along the paths.

FIG. 6 illustrates processing rules determined in step S104 for executing broadcast communication with respect to the virtual nodes 110 to 130 in FIG. 1. For example, a processing rule entry having a matching rule for determining a broadcast packet and a processing content (action) for forwarding the packet to the physical nodes B and F is set in the physical node A (see FIG. 1). Likewise, a processing rule entry having a matching rule for determining a broadcast packet forwarded from the physical node A and a processing content (action) for forwarding the packet to the physical node C in FIG. 1 is set in the physical node B (see FIG. 1).

Next, the processing rule setting unit 303 of the control apparatus 300 sets the determined processing rules in the physical nodes 240 on the broadcast communication paths (step S105).

Subsequently, if the topology configuration of the virtual nodes 110 to 130 on the virtual network 100 or the mapping information about the interfaces of the physical nodes 240 on the physical network 200 managed by the control apparatus 300 is changed (Yes in step S106), the control apparatus 300 transmits information about such change from the virtual network setting unit 304 to the virtual network management unit 307 and the operation returns to step S103. In this way, the processing rules that are held in the physical nodes 240 and that could be affected by the change are reset. If the network topology of the physical nodes 240 on the physical network 200 is changed, the operation returns to step S101 and the control apparatus 300 executes step S101, again.

When a physical node 240 in which a processing rule has been set in the above way receives a packet matching the set processing rule, in accordance with the content of the processing rule, the physical node 240 rewrites the header of the packet as needed and forwards the packet from one or a plurality of interfaces. In this way, broadcast communication on the virtual network 100 can be realized in which the physical nodes 240 do not need to transmit processing rule setting requests about broadcast communication packets.

While an exemplary embodiment of the present invention has thus been described, the present invention is not limited thereto. Further variations, substitutions, and adjustments can be made without departing from the basic technical concept of the present invention. For example, the number of physical nodes and the number of virtual nodes illustrated in the above exemplary embodiment are examples to facilitate description of the present invention. Namely, the present invention is not of course limited to these examples.

Likewise, while a single virtual network is configured in the above exemplary embodiment, the number of virtual networks is not particularly limited. For example, if a plurality of virtual networks are configured, a broadcast range may be set for each virtual network, and a broadcast communication processing rule having a matching rule for determining a virtual network may be set. In this way, since the virtual networks can be distinguished from each other, broadcast or multicast communication can be executed on a corresponding domain.

In addition, in the above exemplary embodiment, a virtual node has a single virtual interface, which is associated with an interface of a physical node 240 connected with an external node (see reference characters 510 to 530 in FIG. 1). However, this is to facilitate description of the present invention. Namely, a virtual node may be provided with a plurality of virtual interfaces. In addition, various modes can be used for mapping with the physical network.

Finally, exemplary embodiments of the present invention will be summarized.

Embodiment 1

(See the information system according to the first aspect)

Exemplary Embodiment 2

It is preferable that, when newly establishing the virtual network, the control apparatus create the broadcast range and set a processing rule realizing the broadcast communication in the physical nodes.

Exemplary Embodiment 3

It is preferable that, when changing a configuration of the virtual network, the control apparatus update the broadcast range and update a processing rule realizing the broadcast communication.

Exemplary Embodiment 4

It is preferable that the control apparatus be capable of setting the broadcast range per virtual network.

Exemplary Embodiment 5

It is preferable that the broadcast range be a virtual network broadcast domain in which all the interfaces among virtual nodes on a virtual network are specified.

Exemplary Embodiment 6

(See the control apparatus according to the second aspect)

Exemplary Embodiment 7

It is preferable that the broadcast range managed by the broadcast range management unit be a virtual network broadcast domain in which interfaces among virtual nodes on a virtual network are specified.

Embodiment 8

(See the communication method according to the third aspect)

Exemplary Embodiment 9

It is preferable that updating the broadcast range be executed when the virtual network is newly established or a configuration of the virtual network is changed.

Exemplary Embodiment 10

(See the program according to the fourth aspect)

Constituent elements or steps of the communication method and the program can be similarly extended to exemplary embodiments 2 to 5, as in the information system according to exemplary embodiment 1.

Modifications and adjustments of the exemplary embodiments are possible within the scope of the overall disclosure (including the claims) of the present invention and based on the basic technical concept of the present invention. Various combinations and selections of various disclosed elements (including the elements in each of the claims, the exemplary embodiments, drawings, etc.) are possible within the scope of the claims of the present invention. That is, the present invention of course includes various variations and modifications that could be made by those skilled in the art according to the overall disclosure including the claims and the technical concept.

REFERENCE SIGNS LIST 100 virtual network
110 to 130 virtual node
200 physical network
210 to 230 external node
240 physical node
300 control apparatus
301 physical node information management unit
302 secure channel communication unit
303 processing rule setting unit
304 virtual network setting unit
305 processing rule determination unit
306 broadcast range management unit
307 virtual network management unit

What is claimed is:

1. A control apparatus, comprising:
   memory storing virtual network information including a destination virtual node which is a destination of a broadcast communication in a virtual network; and
   a processor configured to execute program instructions to:
      identify, based on the virtual network information, a plurality of destination interfaces of physical nodes located in a physical network, a physical node of the physical nodes corresponding to the destination virtual node;
      identify a path between the identified plurality of destination interfaces for transmitting a packet corresponding to the broadcast communication in the virtual network; and
      send, to a physical node on the identified path, a packet processing instruction to forward the packet,
   wherein the packet processing instruction instructs the physical node to transmit the packet along the identified path corresponding to the broadcast communication in the virtual network.

2. The control apparatus according to claim 1, wherein the processor is further configured to execute program instructions to send the packet processing instruction before performing the broadcast communication in the virtual network.

3. The control apparatus according to claim 1, wherein the processor is further configured to execute program instructions to:
   update, based on virtual network configuration information corresponding to a change of the virtual network, the virtual network information; and
   identify, based on the updated virtual network information, the destination interfaces.

4. The control apparatus according to claim 1, wherein the virtual network information includes a virtual network identifier representing a virtual network, and
wherein the processor is further configured to execute program instructions to identify, based on the virtual network information, the virtual network from a plurality of virtual networks.

5. The control apparatus according to claim 1, wherein the processor is further configured to execute program instructions to:
identify, based on the virtual network information and physical network configuration information corresponding to a change of the physical network, the destination interfaces.

6. A communication system, comprising:
a plurality of switch apparatus; and
a control apparatus configured to control the plurality of switch apparatus,
wherein the control apparatus comprises:
memory storing virtual network information including a destination virtual node which is destination of a broadcast communication in a virtual network; and
a processor configured to execute program instructions to:
identify, based on the virtual network information, a plurality of destination interfaces of edge switch apparatus located in a physical network, a physical node of the physical nodes corresponding to the destination virtual node;
identify a path between the identified plurality of destination interfaces for transmitting a packet corresponding to the broadcast communication in the virtual network; and
send, to a core switch apparatus on the identified path, a packet processing instruction to forward the packet,
wherein the packet processing instruction instructs the physical node to transmit the packet along the identified path corresponding to the broadcast communication in the virtual network.

7. The communication system according to claim 6, wherein the processor is further configured to execute program instructions to send the packet processing instruction before performing the broadcast communication in the virtual network.

8. The communication system according to claim 6, wherein the processor is further configured to execute program instructions to:
update, based on virtual network configuration information corresponding to a change of the virtual network, the virtual network information; and
identify, based on the updated virtual network information, the destination interfaces.

9. The communication system according to claim 6, wherein the virtual network information includes a virtual network identifier representing a virtual networks, and
wherein the processor is further configured to execute program instructions to identify, based on the virtual network information, the virtual network from a plurality of virtual networks.

10. The communication system according to claim 6, wherein the processor is further configured to execute program instructions to:
identify, based on the virtual network information and physical network configuration information corresponding to a change of the physical network, the destination interfaces.

11. A network control method, comprising:
identifying, based on virtual network information including a destination virtual node which is destination of a broadcast communication in a virtual network, a plurality of destination interfaces of physical nodes located in a physical network, a physical node of the physical nodes corresponding to the destination virtual node;
identifying a path between the identified plurality of destination interfaces for transmitting a packet corresponding to the broadcast communication in the virtual network; and
sending, to a physical node on the identified path, a packet processing instruction to forward the packet,
wherein the packet processing instruction instructs the physical node to transmit the packet along the identified path corresponding to the broadcast communication in the virtual network.

12. The network control method according to claim 11, further comprising:
sending the packet processing instruction before performing the broadcast communication in the virtual network.

13. The network control method according to claim 11, further comprising:
updating, based on virtual network configuration information corresponding to a change of the virtual network, the virtual network information; and
identifying, based on the updated virtual network information, the destination interfaces.

14. The network control method according to claim 11, further comprising:
identifying, based on the virtual network information, a virtual network from a plurality of virtual networks,
wherein the virtual network information includes a virtual network identifier representing the virtual network.

15. The network control method according to claim 11, further comprising:
identifying, based on the virtual network information and physical network configuration information corresponding to a change of the physical network, the destination interfaces.

16. The control apparatus according to claim 1, wherein the physical node corresponding to the destination virtual node comprises an interface connected to an external node.

17. The control apparatus according to claim 1, wherein the virtual network information comprises information for determining the virtual network so that the physical nodes can identify the destination interface for the virtual network.

18. The control apparatus according to claim 1, wherein the processor is configured to execute program instructions to identify the path between the plurality of destination interfaces of physical nodes from among a plurality of path candidates.

19. The control apparatus according to claim 1, wherein the packet processing instruction includes a matching rule for determining a broadcast packet and a processing content for forwarding the packet.

20. A network control method, comprising:
identifying, based on virtual network information, a virtual network from a plurality of virtual networks, the virtual network information including:
a virtual network identifier representing the identified virtual network; and
a destination virtual node which is a destination of a broadcast communication in the identified virtual network;

identifying, based on the virtual network information, a plurality of destination interfaces of physical nodes located in a physical network, a physical node of the physical nodes corresponding to the destination virtual node;

identifying a path between the identified plurality of destination interfaces for transmitting a packet corresponding to the broadcast communication in the identified virtual network; and before performing the broadcast communication in the identified virtual network, sending, to a physical node on the identified path, a packet processing instruction to forward the packet, wherein the packet processing instruction instructs the physical node to transmit the packet along the identified path corresponding to the broadcast communication in the identified virtual network.

* * * * *